Nov. 3, 1953  M. J. STURTEVANT  2,657,948
VEHICLE SILL MAT
Filed Dec. 23, 1949
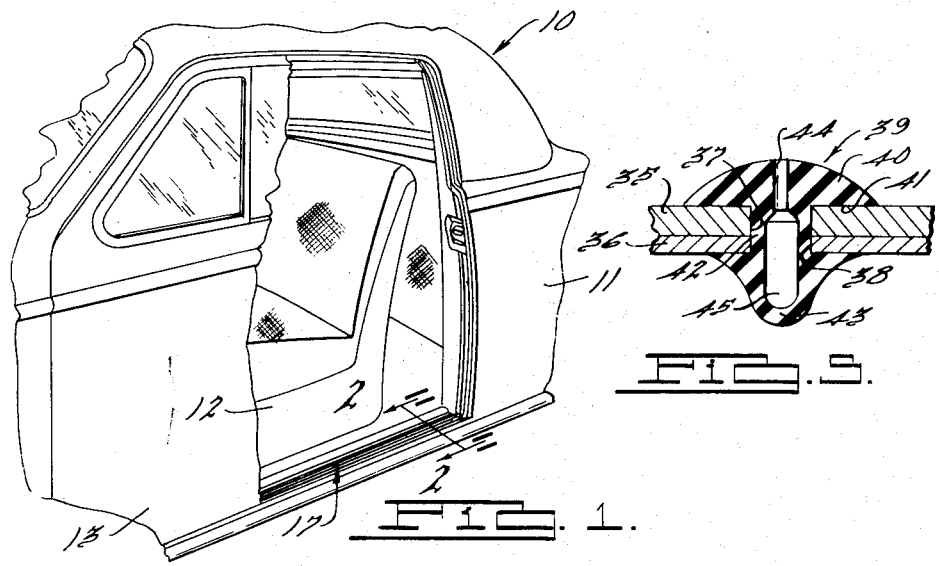
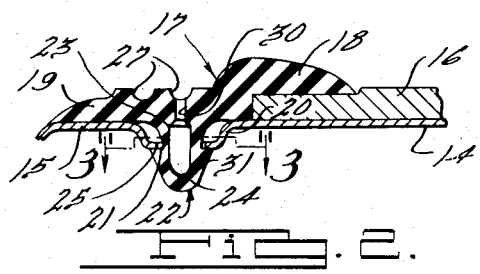
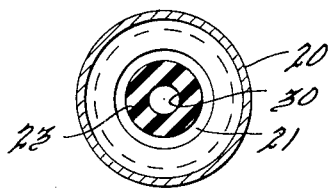
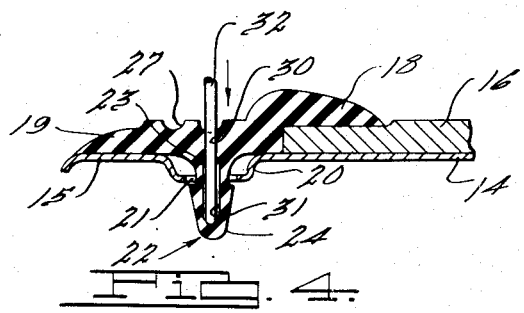
INVENTOR.
Mark J. Sturtevant.
BY Harness and Harness
ATTORNEYS.

Patented Nov. 3, 1953

2,657,948

UNITED STATES PATENT OFFICE 2,657,948

VEHICLE SILL MAT

Mark J. Sturtevant, St. Clair Shores, Mich., assignor to Chrysler Corporation, Highland Park, Mich., a corporation of Delaware Application December 23, 1949, Serial No. 134,676

2 Claims. (Cl. 296—1)

1

My invention relates to coverings for sills and the like and more particularly to an improved type sill covering for a motor vehicle as well as to improved fastening members for securing such coverings or parts of other assemblies in place.

In the past, many foot mats for vehicle sills have been made by bonding rubber-like material to metallic backing plates and thereafter securing the latter to the sills of the vehicles. It has been proposed to eliminate the backing plates from the structures by providing the rubber-like material with depending integral yieldable plugs which would secure the rubber-like material directly to the sill.

A principal object of my invention is to provide a vehicle sill with an improved covering or mat which may be made as an integral structure unlike those known in the art.

Another object of my invention is to provide an improved yieldable mat for vehicles which may be conveniently and readily applied thereto.

A further object of my invention is to provide an improved vehicle sill mat which is made entirely of rubber-like yieldable material thereby eliminating any metallic members or any process of bonding any metallic members to yieldable rubber-like material.

Still another object of my invention is to provide an improved vehicle sill mat which is easily and economically manufactured.

An additional object of the invention is to provide improved snap-on like fastening means in a device of this kind which may consist substantially entirely of rubber-like material and which may be utilized to form a secure attachment between diverse types of parts of many different assemblies.

Other objects and advantages will become more apparent from the following description of one embodiment of my invention, reference being had to the accompanying drawings in which:

Fig. 1 is a fragmentary perspective view of a motor vehicle having portions broken away to more clearly locate my invention.

Fig. 2 is a sectional view taken on the line 2—2 of Fig. 1.

Fig. 3 is a transverse sectional view taken on the line 3—3 of Fig. 2.

Fig. 4 is a sectional view similar to Fig. 2 showing the application of a tool to my invention.

Fig. 5 is a fragmentary sectional view illustrating another use of a fastening member embodying the invention.

In the drawings I have shown a motor vehicle, generally designated by the numeral 10, including a body portion 11, a conventional seat 12 and a vehicle door 13. The vehicle is also provided with a floor portion or backing plate 14, the outer extremity thereof forming a sill 15 which is directly disposed beneath the lower edge of the door 13. The floor portion 14 is provided with a floor mat 16 composed preferably of a fabric or rubber material and is also provided with a sill mat, generally designated by the numeral 17, which is disposed over the sill 15 of the floor portion 14. The sill mat 17 extends longitudinally of the sill 15 the entire length of the lower lateral edge of the door 13. The sill mat 17 is provided with a raised section 18 which overlaps the outer lateral edge of the floor mat 16 as well as a section 19 which engages the sill 15.

The sill 15 is provided with a plurality of substantially cylindrical depressions 20 which are aligned in the direction of the length of the sill 15 and each depression is provided with a circular opening 21 in the lower portion thereof. The openings 21 are adapted to receive plugs, generally designated by the numeral 22, which are integral with the section 19 of the sill mat 17. Each plug 22 is provided with a neck portion 23 which connects the section 19 of the sill mat 17 to a head portion 24 of the plug, the head portion having a circular shoulder 25 which engages the sill 15 on the opposite side from the section 19 of the sill mat 17 adjacent the periphery of the opening 21. In this manner the mat 17 is rigidly secured to the sill 15. When the plugs 22 are in their normal relaxed state, the circular shoulders 25 thereof are not spaced sufficiently from the under side of the section 19 of the mat to allow those shoulders to contact the lower side of the bottom walls of the depressions. The neck portion 23 is under tension when in the position as shown in Fig. 2, and exerts pressure upon the lower surface of the section 19 and the shoulder 25. This is obviously accomplished by providing that the distance between the heads 24 of plugs 22 and section 19 of sill mat 17 is less, in the disassembled and relaxed state of the plugs, than the distance between the upper surface of floor portion 14 and the lower surface of the depressions 20. The section 19 of the mat 17 is provided with a pair of longitudinally extending ornamental grooves 27 which facilitate gripping action between the sill mat and the shoe of a person entering or leaving the vehicle. The section 19 is also provided with a recess 30 which extends downwardly through one of the grooves 27 and the section 19 and opens into a cylindrical opening 31 which is disposed in the neck portion 23 and the head portion 24.

The recess 30 is provided in each of the plugs 22 for receiving a tool 32 to facilitate stretching of the necks 23 and heads 24 of the plugs.

The tool 32 is utilized to stretch the plug 22 longitudinally by exerting pressure in the direction of the arrow in Fig. 4, thereby reducing the width of the head of the plug and allowing it to pass through the opening 21 while at the same time placing the neck 33 under tension. After the plug 22 has been pushed through the opening, the tool 32 is removed and the plug assumes the configuration as shown in Fig. 2. The head portion 24 of the plug 22 is of a substantially frustoconical configuration to facilitate the aforementioned passage of the head portion 24 through the opening 21, the base of this configuration being the shoulder 25.

Although numerous yieldable materials may be used to form my improved sill mat and the attaching plugs thereof, it has been found very desirable to use materials such as natural rubber or synthetic rubber, as, for example, vinyl resins, elastomer resins and thermosetting plastic materials.

The improved plug type fastening member 22 of the sill mat 17 may be used to secure various types of parts of diverse assemblies together or to hold in place yieldable abutments of different constructions. In Fig. 5 of the drawing is illustrated an assembly comprising adjacent parts 35 and 36 of rigid or semi-rigid material having registering apertures 37 and 38. A plug type fastening member, generally designated by the numeral 39, is utilized to clampingly attach the parts 35 and 36 together. This fastening member is substantially identical to the fastening plugs 22 shown in Figs. 1 to 4, inclusive, but in place of being integral at its upper end with a mat of extended dimensions, it is provided with a head portion 40 having a lower side surface 41 engageable with the upper surface of the part 35. The head portion 40 of the fastening plug is provided with a downwardly extending neck 42 which has a second head portion 43 on its lower end substantially identical in construction to the head portions 24 of the plug type fastening members shown in Figs. 1 to 4, inclusive. Extending axially of the plug type fastening member 39 is a cylindrical passage or recess 44 which passes through the upper head portion 40, neck 42 and into the lower head portion 43 where it terminates in a slightly enlarged spherical cavity 45.

The plug type fastening member 39 may be applied in the manner illustrated in Fig. 4 with the aid of a suitable tool which will elongate the plug axially and reduces its cross sectional dimensions to accommodate passage of the lower head portion 43 through the openings 37 and 38 in the parts 35 and 36, respectively.

The relaxed length of the neck portion 42 is less than the combined thicknesses of the parts 35 and 36 and thus, when the tool is removed, the parts 35 and 36 are clampingly engaged between the upper and lower head portions 43 and 40, respectively, of the fastening plug.

If the device is desired to be employed as an abutment, for example, it may be applied to a single thickness of material by suitably predetermining the length of the neck 42 with respect to the thickness of the material and the upper head 40 may be formed to any desired shape.

My improved sill mat is conveniently applied to a vehicle due to its integral construction, its simplicity and its yieldability. It should also be noted that my improved mat may be used as a replacement for sill mats used on many vehicles. It will be noted that my improved sill mat may be provided with a backing plate bonded thereto if it is found desirable to stiffen the sill mat. It should also be noted that my structure forms a seal when connected to the vehicle at the head portion of the plug on one form and at both the head and neck portions on the form shown in Fig. 5. This seal prevents the influx of dust and other foreign matter into the vehicle.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. In a vehicle including a body portion having a sill, said sill having an opening therein, a mat adapted to cover said sill comprising a rubber-like strip adapted to engage one face of said sill, a yieldable rubber-like plug integrally connected to said strip having a neck adapted to extend through said opening and a head adapted to engage another face of said sill to clampingly connect said sill and strip, said mat being provided with a tool receiving recess for facilitating the elongation of said head to permit passage thereof through said opening, said recess having an entrant portion of a predetermined diameter in said strip and said recess extending through said neck and terminating in said head in a portion of enlarged diameter whereby the recess is adapted to receive a tool of not to exceed said predetermined diameter and the portion of said recess which has an enlarged diameter facilitates reduction in diameter of the head portion during said elongation.

2. In a device including a body portion having a backing plate provided with an opening therein, a mat adapted to cover said backing plate comprising a rubber-like strip adapted to engage one face of said backing plate, a yieldable rubber-like plug integrally connected to said strip having a neck adapted to extend through said opening and a head adapted to engage another face of said backing plate to clampingly connect said backing plate and strip, said mat being provided with a tool receiving recess for facilitating the elongation of said head to permit passage thereof through said opening, said recess having an entrant portion of a predetermined diameter in said strip and said recess extending through said neck and terminating in said head in a portion of enlarged diameter whereby the recess is adapted to receive a tool of not to exceed said predeterminad diameter and the portion of said recess which has an enlarged diameter facilitates reduction in diameter of the head portion during said elongation.

MARK J. STURTEVANT.

References Cited in the file of this patent

UNITED STATES PATENTS

| Number | Name | Date |
| --- | --- | --- |
| 1,826,705 | Carr | Oct. 13, 1931 |
| 2,019,663 | Duffy | Nov. 5, 1935 |
| 2,039,401 | Foges | May 5, 1936 |
| 2,088,739 | Geyer | Aug. 3, 1937 |
| 2,172,132 | Schneible | Sept. 5, 1939 |
| 2,270,266 | Cavanagh | Jan. 20, 1942 |
| 2,281,586 | Kramer | May 5, 1942 |
| 2,358,206 | Boersma | Sept. 12, 1944 |
| 2,368,200 | Cavanagh | Jan. 30, 1945 |
| 2,426,326 | Tooms | Aug. 26, 1947 |